United States Patent [19]

Kamijo

[11] Patent Number: 4,956,734
[45] Date of Patent: Sep. 11, 1990

[54] MODE CHANGEOVER MECHANISM FOR TAPE RECORDERS

[75] Inventor: Masao Kamijo, Tokyo, Japan

[73] Assignee: Kabushiki Kaisha Sankyo Seiki Seisakusho, Nagano, Japan

[21] Appl. No.: 368,861

[22] Filed: Jun. 20, 1989

[30] Foreign Application Priority Data

Aug. 10, 1988 [JP] Japan ................................. 63-198046

[51] Int. Cl.⁵ .......................... G11B 5/54; G11B 21/12
[52] U.S. Cl. .................................... 360/105; 360/137
[58] Field of Search ................................ 360/105, 137

[56] References Cited

U.S. PATENT DOCUMENTS

| | | | |
|---|---|---|---|
| 4,674,001 | 6/1987 | Takahashi et al. | 360/105 |
| 4,757,405 | 7/1988 | Laudus | 360/105 |
| 4,760,479 | 7/1988 | Suzuki et al. | 360/105 |
| 4,873,597 | 10/1989 | Hatanaka | 360/105 |
| 4,896,234 | 1/1990 | Watanabe et al. | 360/105 |

Primary Examiner—Robert S. Tupper
Attorney, Agent, or Firm—Jones, Tullar & Cooper

[57] ABSTRACT

A mode changeover mechanism for tape recorders is provided in which any solenoid is not used, and in which a capstan gear is rotated and a gear arm is turned by a motor rotatable in opposite directions to selectively rotate a supply or take-up reel, and the engagement of the capstan gear with an assist gear having a toothless segment is controlled by the turning of the gear arm to vary the position of a head plate by eccentric and changeover cams formed on the assist gear, thereby changing the operation modes of a tape recorder.

2 Claims, 6 Drawing Sheets

MODE CHANGEOVER MECHANISM FOR TAPE RECORDERS

FIELD OF THE INVENTION

The present invention relates to a mode changeover mechanism for tape recorders used for telephone message recorders, etc.

BACKGROUND OF THE INVENTION

Heretofore, tape recorders used for telephone message recorders have been designed such that the "record/playback", "rewind", "fast forward" and "stop" modes are remote-controllable. In order to make such remote control feasible, it has been proposed to (1) directly operate the changeover levers for the individual modes by a solenoid, (2) engage an assist cam gear with a gear rotated by a main motor by a solenoid, thereby operating a head plate with an assist gear, and so on.

However, problems with the use of such a solenoid as mentioned above are:

(1) the power to be consumed is so increased that a power source section is increased in size, resulting in increased costs,
(2) the volume and weight of a mechanical section are increased, and
(3) some limitation is imposed upon the position of the mechanical section to be used by reason that since there is a variation in the suction force depending upon whether the plunger is moved vertically or horizontally, it is desired for a wall type of telephone message recorder that the plunger be located horizontally.

SUMMARY OF THE INVENTION

In consideration of the foregoing problems, an object of the present invention is to provide a mode changeover mechanism for tape recorders, in which a sliding forward movement of a head plate and a change of "playback" and "fast forward" positions are achievable with eccentric and changeover cams of an assist gear without recourse to any solenoid, which makes contribution to current and space savings and reductions in cost, and which can be used in any free position.

According to the present invention, the above object is achieved by the provision of a mode changeover mechanism for tape recorders comprising in combination:

a motor rotatable in opposite directions,
a capstan gear rotatable in unison with a capstan shaft by said motor,
a gear arm provided such that it is rotatable in the direction of rotation of said capstan shaft,
two gears rotatably supported on said gear arm such that they are always in mesh with said capstan shaft to selectively drive a supply reel or a take-up reel,
an assist gear having a toothless segment and whose engagement with said capstan gear is controlled by the turning of said gear arm,
an eccentric cam and a changeover cam formed on said assist gear, and
means for controlling the position of a head plate to slide forth said head plate by said eccentric cam and change said head plate to a "playback" or "fast forward" position.

BRIEF DESCRIPTION OF THE DRAWINGS

The above and other objects and features of the present invention will now be apparent from a reading of the following detailed description with reference to the accompanying drawings, which are given for the purpose of illustration in which.

DESCRIPTION OF THE PREFERRED EMBODIMENTS

Figure 1:
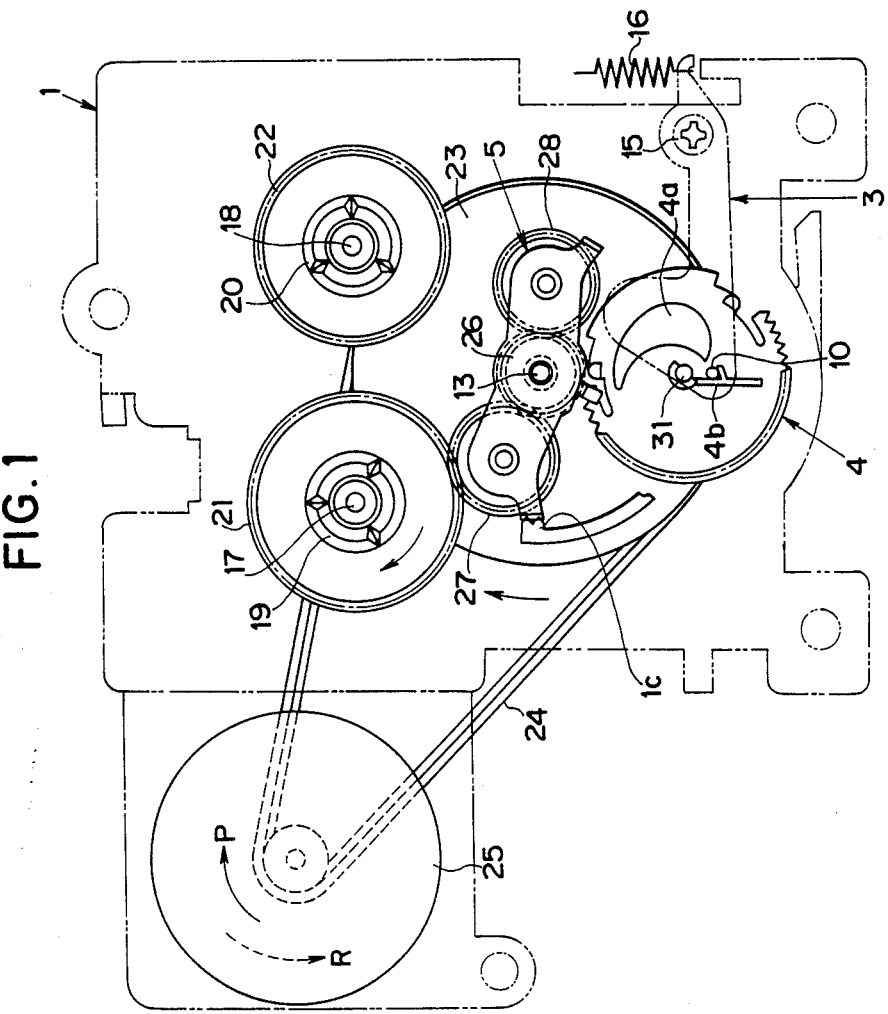
FIG. 1 is a plan view showing part of the mode changeover mechanism for tape recorders according to the present invention, as viewed through a base plate in the "record/playback" mode.
Figure 2:
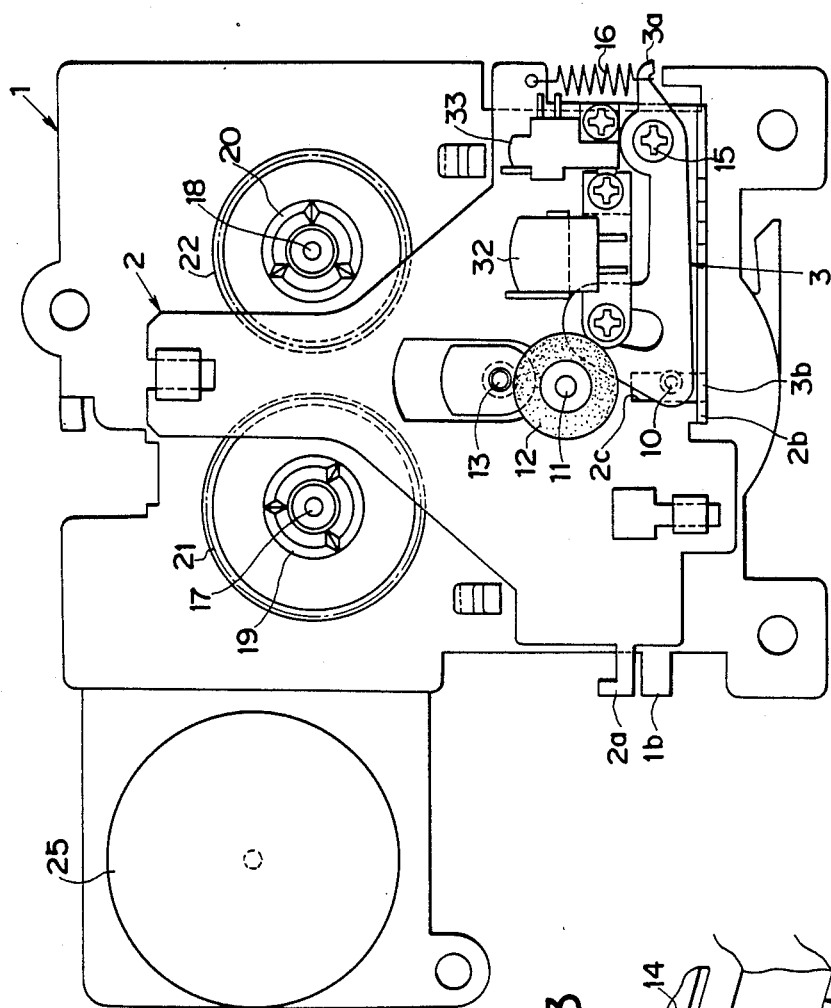
FIG. 2 is a plan view of that mode changeover mechanism.

Referring now to FIGS. 1 and 2 which are plan views of one embodiment of the mode changeover mechanism for a tape recorder in the "record/playback" mode, the tape recorder typically includes a base plate 1 formed of a resin and a head plate 2 placed thereon. A pin shaft 10 fixed to an assist arm 3 is rotated by an eccentric cam 4a of an assist gear 4 to move the head plate 2 back and forth, and a pinch roller 12 rotatably supported on the head plate 2 engages a capstan shaft 13 by a pin 11.

Figure 3:
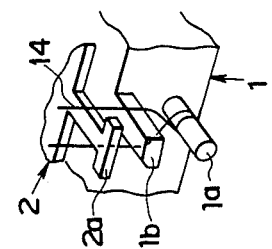
FIG. 3 is a perspective view of a biasing mechanism in which a spring is mounted to slide a head plate back and forth.

Referring to FIG. 2, since a protrusion 2a is pushed the head plate 2 is designed to return to a "stop" position, as shown in FIG. 3, by a spring 14 held by a spring supporter 1a and a spring retainer 1b.

Figure 4:
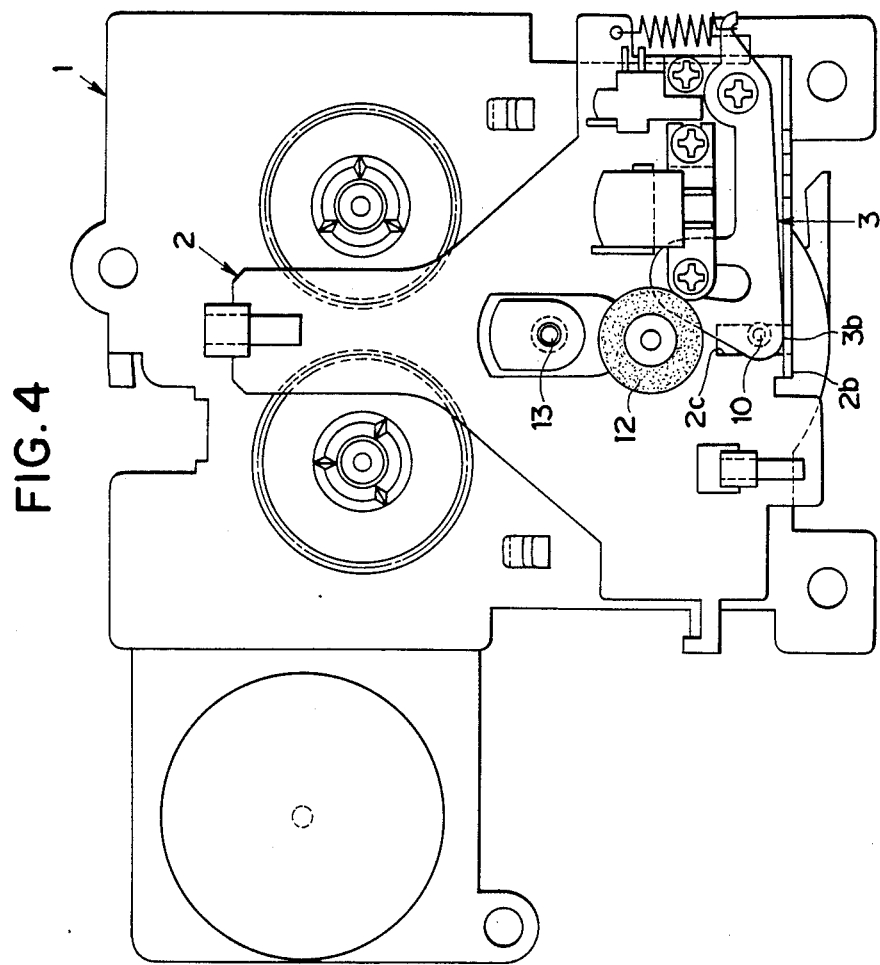
FIG. 4 is a plan view of part of the mode changeover mechanism for tape recorders in the "stop" and "rewinding" modes.

As illustrated in FIGS. 1 and 2, the assist arm 3 is rotatably supported on the base plate 1 by a screw shaft 15, and is biased in the counterclockwise direction by a spring 16 provided between its one end 3a and the head plate 2. In the "stop" mode shown in FIG. 4, the assist arm 3 abuts on its one side 3b against a bend 2b. The pin shaft 10 fixed to the assist arm 3 extends through a through-hole (not shown) in the base plate 1 and a through-hole 2c in the head plate 2 to a position where it faces and can abut against the eccentric cam 4a or a changeover cam 4b of the assist gear 4.

The base plate 1 is fixedly provided with reel-shafts 17 and 18 in an upward manner, which receive rotatably therethrough a tape take-up reel holder 19 and a tape feed reel holder 20. The tape take-up and supply reel holders 19 and 20 are respectively provided with a take-up reel gear 21 and supply reel gear 22 through the respective associated friction mechanisms, so that any rotational force more than the preset torque is not transmitted thereto. Rotatably supported on the base plate 1 is a fly-wheel 23 having the capstan shaft 13 as an integral piece, as illustrated in FIG. 1, said capstan shaft 13 extending upwardly through the head plate 2. The fly-wheel 23 is rotatably driven by a motor 25 rotatably in opposite directions through a belt 24 provided along and in a peripheral groove.

Figure 5:
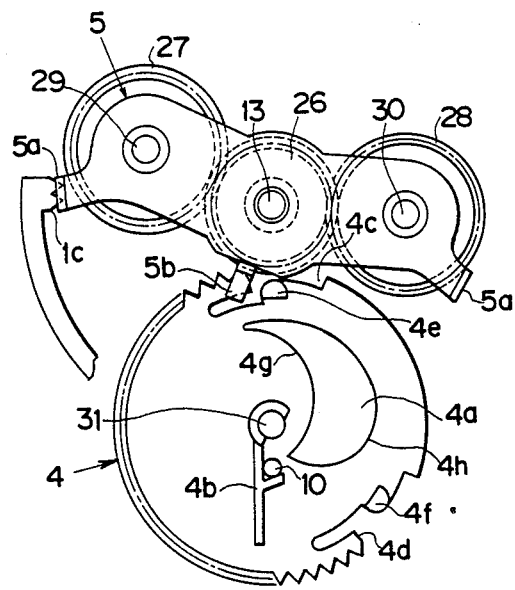
FIG. 5 is an enlarged plan view of a gear arm and an assist gear shown in FIG. 1.

The capstan shaft 13 is fixed with a capstan gear 26 and provided with a gear arm 5 rotatable in the rotational direction thereof through a friction mechanism. As illustrated in FIGS. 1 and 5, on both sides of the gear arm 5 there are gears 27 and 28 in constant mesh with the capstan gear 26, which are rotatably supported on shafts 29 and 30. One combination of gear 27 with shaft 29 is provided with a friction mechanism for applying thereto a load suitable to rotate the gear arm 5 per se by the rotation of the capstan gear 26. On one side within a region in which the gear arm 5 turns, the base plate 1 is provided with a toothed projection 1c to be in mesh with the gear 27. On both sides of the gear arm 5, there are provided bent pieces 5a and 5a which are inserted into window openings (not shown) in the base plate 1 to limit the range of rotation thereof. Additionally, a protrusion 5b is provided on one side of the center of the gear arm 5.

The base plate 1 is fixedly provided with a downward shaft 31 for rotatably supporting the assist gear 4, which is located in a position where it can mesh with the capstan gear 26.

The assist gear 4 is provided on its outer periphery with toothless segments 4c and 4d, which are in turn provided with triggering engagement means 4e and 4f, defined by pins, to be pushed with the protrusion 5b of the gear arm 5.

The head plate 2 is provided thereon with a recording/reproducing head 32 and an erasing head 33.

Referring to the operation of the mode changeover mechanism of the tape recorder, when the motor 25 is driven in a direction shown by an arrow P to rotate the fly-wheel 23 in the clockwise direction for changing the "stop" mode shown in FIGS. 4 to 7 to the "record/playback" mode shown in FIGS. 1, 2 and 5, the gear arm 5 is integrally turned in the clockwise direction so that the gear 27 in constant mesh with the capstan gear 26 meshes with the take-up reel gear 21, since a load is applied to between the gear arm 5 and the capstan gear 26 through the friction mechanism provided for the combination of gear 27 with shaft 29.

Figure 7:
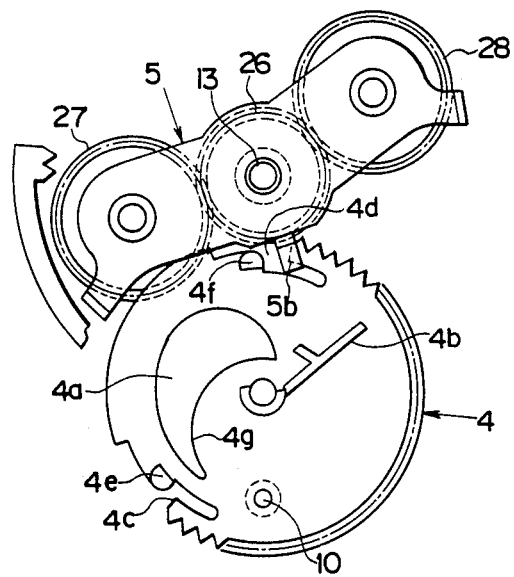
FIG. 7 is an enlarged view of a gear arm and an assist gear shown in FIG. 6.
Figure 6:
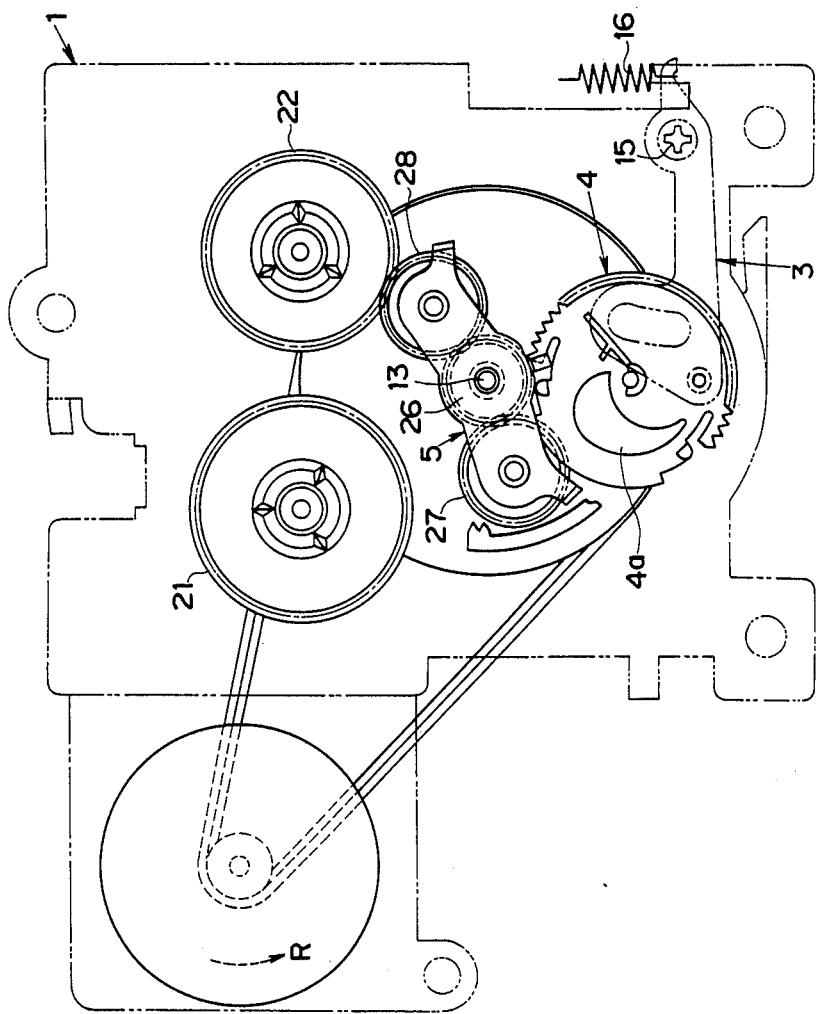
FIG. 6 is a plan view of part of the mode changeover mechanism for tape recorders, as viewed through a base plate in the "stop" and "rewind" modes.

In the "stop" mode, one toothless segment 4d of the assist gear 4 is then located in a position opposite to the capstan gear 26, as illustrated in FIGS. 6 and 7. During the turning of the gear arm 5, however, the triggering engagement pin 4f is pushed by the protrusion 5b to cause the assist gear 4 to rotate in the counterclockwise direction. This in turn permits the assist gear 4 to mesh with the capstan gear 26, which then makes a half turn.

As a counterclokwise force of rotation is applied to the eccentric cam 4a through such a half turn, the pin shaft 10 is moved along an inner cam surface 4g of the eccentric cam 4 toward its center to turn the assist arm 4. The spring 16 permits the assist arm 3 to be abutted against the bend 2b by the movement of the pin shaft 10, so that when the pin shaft 10 is moved forth with a force smaller than that of the spring 16, the head plate 2 is slid forth integrally therewith. If the head plate 2 is further moved forth until the pinch roller 12 contacts the capstan shaft 13 with a tape located therebetween, as illustrated in FIG. 2, then the sliding movement of the head plate 2 is stopped so that the "record/playback" mode is ready to operate. However, the assist gear 4 continues to rotate further to turn only the assist arm 3 around the screw shaft 15, so that its one side 3b is spaced from the bend 2b and the pin shaft 10 passes through the innermost portion of the eccentric cam 4. Thereafter, upon the other toothless segment 4c of the assist gear 4 reaching the position of the capstan gear 26, the capstan gear 26 disengages the assist gear 4, the rotation of the assist gear 4 is stopped.

After the pin shaft 10 has passed through the innermost portion of the eccentric cam 4a, it is locked by the spring 16 in a V-shaped notch in the changeover cam 4b. Since the one side 3b of the assist arm 3 is located in a position where it comes in no contact with said bend 2b, however, the pinch roller 12 is pushed against the capstan shaft 13 by the spring 16, while the tape is fed from within a tape cassette toward the tape take-up reel holder 19 at a constant speed. The protrusion 5b of the gear arm 5 is located on the left side of the triggering engagement means 4e.

For a conversion to the "fast forward" mode, the motor 25 is slightly rotated in a direction shown by an arrow R in the "record/playback" mode. This then causes the gear arm 5 to be turned, while the triggering engagement means 4e is pushed by the protrusion 5b of FIG. 5, so that the assist gear 4 is slightly rotated by such triggering means in the clockwise direction. This rotation in turn causes the pin shaft 10 to disengage the changeover cam 4b and take the position of FIG. 8, so that the head plate 2 is restored to the "stop" position.

Figure 8:
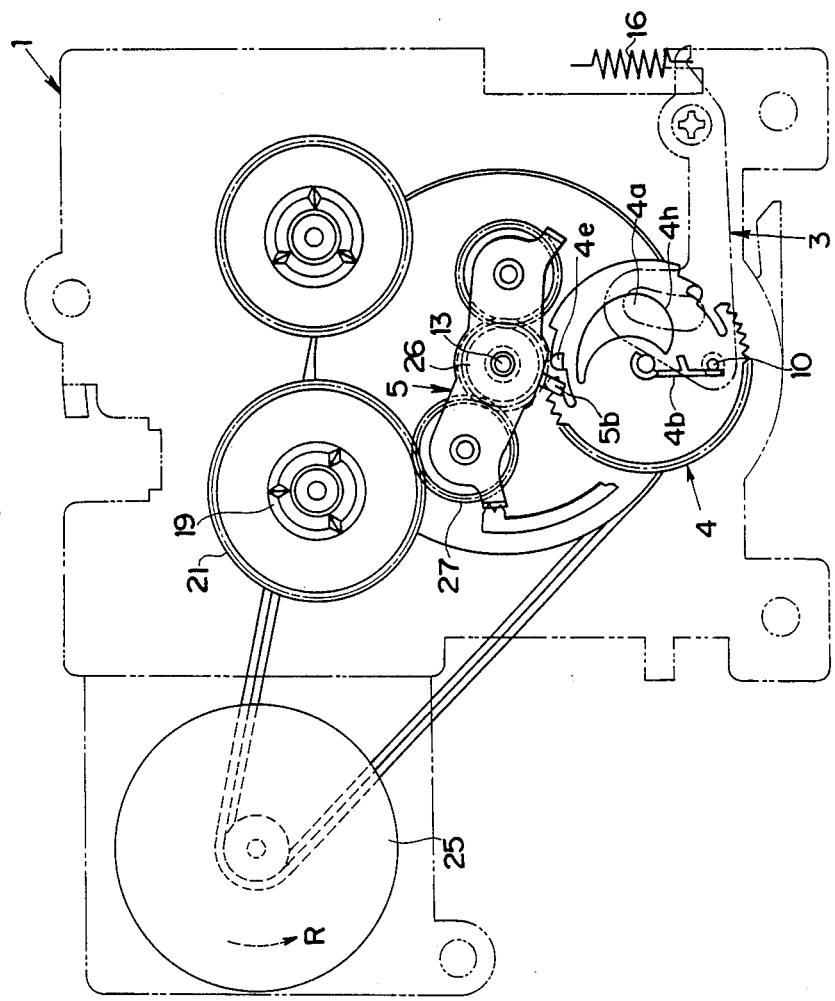
FIG. 8 is a plan view of the mode changeover mechanism for tape recorders, as viewed through a base plate in the "fast forward" mode.

When the motor 25 is then again rotated in the direction shown by the arrow P, the "fast forward" mode of FIG. 8 is achieved. Such motor control is performed by an electronic circuit. With the gear arm 5 turned in the clockwise direction, the tape is fed from within the tape cassette toward the tape take-up reel holder 19, since the gear 28 meshes with the take-up reel gear 21, as is the case with the "record/playback" mode.

At this time, the tape is wound up at a high speed, since the head plate 2 takes the same position as the "stop" position. It is here understood that higher revolutions per minute of the motor 25 will result in higher speed-winding of the tape.

When the "record/playback"/"fast forward" mode is converted to the "stop" mode, the motor 25 is rotated in the direction shown by the arrow R in the "record/playback" mode of FIG. 5 and the "fast forward" mode of FIG. 8. During the turning of the gear arm 5, the triggering engagement means 4a is pushed by the protrusion 5b, whereby the assist gear 4 is rotated in the clockwise direction. This rotation then causes the assist gear 4 to mesh with the capstan gear 26 for rotation. This rotation in turn causes the pin shaft 10 to be moved along an outer cam surface 4h of the eccentric cam 4a. The outer cam surface 4h serves to push down the pin shaft 10 below the "stop" position. Thereafter, the pin shaft 10 is restored by the spring 16 to the "stop" position at the final end of the outer cam surface 4h, and the capstan gear 26 disengages the assist gear 4 in a position where the toothless segment 4c of the assist gear 4 is opposite to the capstan gear 26, so that the motor 25 stops into the "stop" mode of FIG. 6.

For a conversion to the "rewind" mode, the motor 25 is rotated in the counterclockwise direction shown by the arrow R in the "stop" mode of FIG. 6.

A conversion from the "rewind" mode to the "stop" mode may be achieved by stopping only the rotation of the motor 25.

With the mode changeover mechanism for tape recorders, as constructed above, it is possible to decrease the power to be consumed and, hence, reduce the size and weight of the power source section, thus resulting in decreases in cost, since, without recourse to any solenoid, the head plate 1 is moved back and forth by the triggering means for pushing the triggering engagements 4e and 4f of the assist gear 4 with the protrusion 5b of the gear arm 5, thereby controlling the engagement or disengagement of the pinch roller 12 with or from the capstan shaft 13. Furthermore, since the conversion of operational modes takes only depending upon the direction of rotation of the motor 25, such a variation as occurs with the use of a solenoid is unlikely to be induced in the suction characteristics depending upon the position of the mechanical section to be mounted in place. Thus, design can be made with a high degree of freedom. Noises generated from the mechanical section can also be reduced due to no use of any solenoid.

Moreover, the changeover operation can take place so rapidly that the length of waiting time can be reduced, since the "playback" and "fast forward" positions can be changed in the position where the changeover cam 4b is engaged with and locked by the pin shaft 10 and the rewinding of the tape can be merely achieved by the rotation of the motor 25.

When incorporated into a telephone message recorder, the operation of the above mode changeover mechanism for tape recorders involves a repetition of calling-up→announcing by a voice synthesizing IC, etc. →recording of message by the actuation of motor→ calling-off→stopping of motor followed by waiting.

The operation for the reproduction of message involves a repetition of releasing→rewinding of tape by the actuation of motor→initiation of tape supplying reproducing of message by the rotation of motor→completion of playback→rewinding of tape by the rotation of motor→stopping of motor followed by waiting.

As many modifications may be made to the embodiments of the invention, it is intended that all arrangements contained herein be interpreted as illustrative of the invention and not in a limiting sense.

What is claimed is:

1. A mode changeover mechanism for tape recorders comprising in combination:
   a motor rotatable in opposite directions,
   a capstan gear rotatable in unison with a capstan shaft by said motor,
   a gear arm provided such that it is rotatable in the direction of rotation of said capstan shaft,
   two gears rotatably supported on said gear arm such that they are always in mesh with said capstan shaft to selectively drive a supply reel or a take-up reel,
   an assist gear having a toothless segment and whose engagement with said capstan gear is controlled by the turning of said gear arm,
   an eccentric cam and a changeover cam formed on said assist gear, and
   means for controlling the position of a head plate to slide forth said head plate by said eccentric cam and change said head plate to the "playback" or "fast forward" position.

2. A mechanism as claimed in claim 1 wherein said controlling means includes a turnably provided assist arm and a pin shaft provided on said assist arm, said pin shaft being engageable with said eccentric cam or changeover cam to control the position of said head plate.

* * * * *

UNITED STATES PATENT AND TRADEMARK OFFICE
CERTIFICATE OF CORRECTION

PATENT NO. : 4,956,734
DATED : Sept. 11, 1990
INVENTOR(S) : Kamijo

It is certified that error appears in the above-identified patent and that said Letters Patent is hereby corrected as shown below:

TITLE PAGE:
In the heading of the patent, change the assignee to read --Kabushiki Kaisha Sankyo Seiki Seisakusho and Tokyo Pigeon Co., Ltd.--.

In the heading of the patent, change the application number from "368,861" to --368,816--.

Signed and Sealed this

Seventh Day of January, 1992

Attest:

HARRY F. MANBECK, JR.

Attesting Officer   Commissioner of Patents and Trademarks